C. SPIRO.
MOTION PICTURE CAMERA.
APPLICATION FILED APR. 8, 1916.
1,228,855. Patented May 29, 1917.
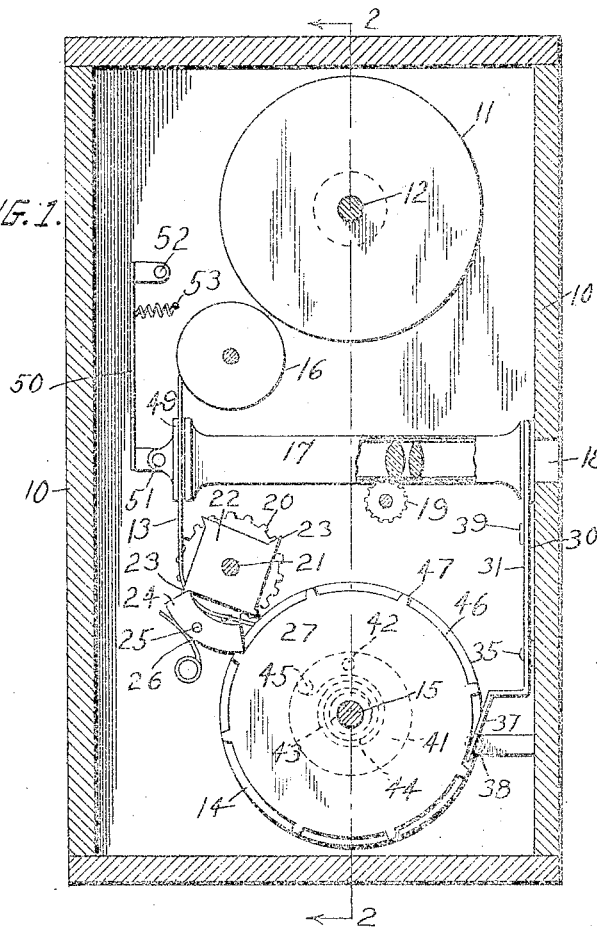
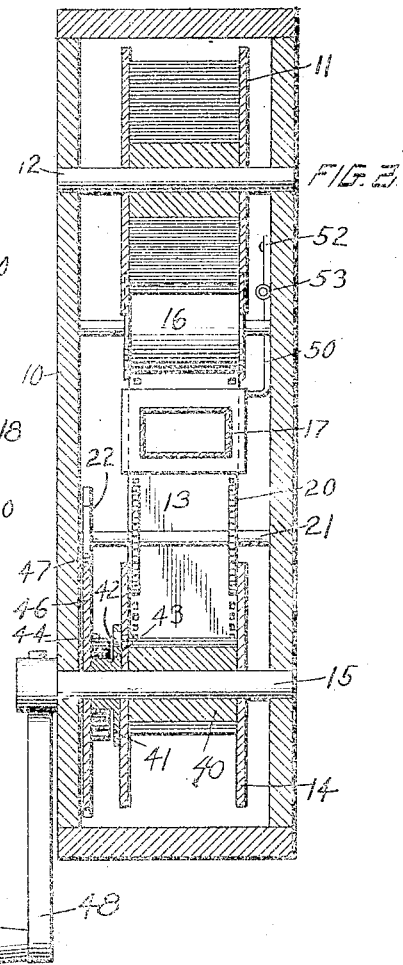
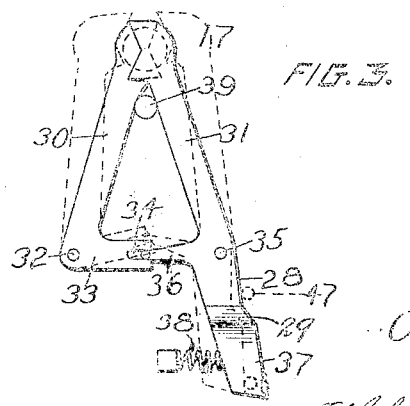
Witnesses
L. R. Fiedler
M. Robson
Inventor
Charles Spiro
Alfred T. Sage
Attorney

UNITED STATES PATENT OFFICE.

CHARLES SPIRO, OF NEW YORK, N. Y.

MOTION-PICTURE CAMERA.

1,228,255.　　　Specification of Letters Patent.　　Patented May 29, 1917.

Application filed April 8, 1916. Serial No. 89,868.

*To all whom it may concern:*

Be it known that I, CHARLES SPIRO, a citizen of the United States, residing at New York, in the county of New York and State of New York, have invented certain new and useful Improvements in Motion-Picture Cameras, of which the following is a specification.

This invention relates to a motion picture camera and particularly to a construction adapted to produce at regulated intervals negatives upon a moving strip of film which when reproduced by proper projecting apparatus effect a moving picture of the object photographed.

The invention has for an object to provide a new and improved construction by which the film is fed by a spring actuated movement of the receiving spool and the exposure shutter is properly regulated coincident with such movement.

Another object of the invention is to provide a novel construction involving a controlling wheel arranged to operate an exposure shutter at proper intervals and also to release a detent controlling the movement of the film in its feeding action.

A further object of the invention is to present an improved construction whereby the driving shaft actuates a tension spring frictionally connected with the receiving spool to permit a slip movement when a predetermined tension has been secured and to effect an instant and rapid feed of the film when released for movement after an exposure.

Other and further objects and advantages of the invention will be hereinafter set forth and the novel features thereof set forth by the appended claims.

In the drawing—

Figure 1 is a side elevation of the mechanism with parts in section;

Fig. 2 is a vertical section on line 2—2 of Fig. 1;

Fig. 3 is a detail front elevation of the shutter mechanism;

Fig. 4 is a detail of the disk and spring connection from the driving shaft.

Like numerals refer to like parts in the several views of the drawing.

The numeral 10 designates the casing of the camera which may be of any desired construction or configuration and has mounted therein at its upper portion a film feeding spool or roll 11 upon the shaft 12. The film 13 extends therefrom to a receiving spool 14 rotatably mounted upon the driving shaft 15 at the lower portion of the casing. The film in its travel between these spools passes over a guide roll 16 and across the end of the lens tube 17 which is disposed in alinement with an aperture 18 in the casing 10 and is adjustable in length for focusing as shown at 19. The film then engages a toothed holding wheel or roll 20 carried by a shaft 21 and is connected to the receiving spool. This shaft also carries a detent wheel 22 having spaced teeth 23 which contact with a pawl 24 pivoted at 25 and, if desired, normally held in engagement therewith by a spring 26. This pawl is formed with a curved face 27 over which the teeth 23 travel so that when released from one tooth the contact thereof with the curved face in its travel automatically throws the pawl back into engagement with the succeeding tooth.

For the purpose of holding the film in proper relation to the lens tube a pressure plate 49 is disposed opposite the end of said tube and supported by an arm 50 pivotally connected thereto at 51. This arm is pivoted to a fixed part at 52 and held under tension by the spring 53 extending therefrom.

The shutter mechanism comprises leaves 30 and 31 each formed as a bell crank lever. The leaf or lever 30 is pivoted at 32 and the arm 33 thereof slotted at 34, as shown in Fig. 3. The lever 31 is pivoted at 35 and the arm 36 thereof enters the slot 34 to cause a joint operation of the leaves of the shutter. The lever 31 is also formed with a tail 28 having an offset operating face 29 and an extension 37 therefrom against which a spring 38 bears to normally retain the shutters in closed position. A stop 39 is disposed between the leaves to limit their closing movement.

The receiving spool 14 has its hub 40 rotatably mounted upon the driving shaft 15 and is adapted to be driven by a disk 41 connected to the spool in any desired manner, for instance, by a pin 42 entering an aperture in the spool. This disk is formed with a hub 43 around which a coiled tension spring 44 is frictionally wound to permit a slipping thereof upon the disk hub when a predetermined tension has been secured as shown by Fig. 4. The outer end of this spring is connected to a pin 45 carried by the controlling wheel 46 secured to the driving shaft 15. This wheel is also provided with spaced teeth or projections 47 upon the periphery thereof disposed to engage the tail of the shutter mechanism and also the detent and thus control the feed of the film and the accurate opening of the shutter intermittently timed by a single part. The driving shaft may be actuated by any desired means, for instance a crank 48.

In the operation of the invention the rotation of the driving shaft is continuous and the spring connection between the controlling wheel and the receiving spool is wound until a predetermined tension is secured when the slipping of the spring upon the disk hub prevents an injurious tension and stores sufficient power to produce a number of rotations of the receiving spool. This feeding of the film by the spring tension causes an instant and rapid intermittent movement thereof when the detent of the holding roll is released by a tooth of the controlling wheel. The film is thus fed or pulled by the receiving spool and no other driving gearing therefor is required. The yielding connection between the driving shaft and receiving spool accommodates the increase in the diameter of the body of film upon the latter as the camera is operated, which would otherwise cause an increase in the speed of travel of the film, and effects a uniform number of exposures per second and a proper positioning of the film therefor. This driving of the receiving spool prevents undue tension upon the film and also any rebound thereof because there is at all times a constant even tension upon the spool.

It will be understood that the receiving spool carries as a part thereof the friction hub which is embraced by the inner end of the driving spring, having a tight frictional contact therewith producing substantially a positive connection for driving until the tension placed upon the end of said spring, at its connection with the controlling wheel secured upon the driving shaft, is sufficient to overcome this frictional contact and permit a release or slipping of the parts so that the receiving spool may be at rest or have only a very limited movement. The detent pawl only retains its wheel for a very short interval, equal to the distance between the contacts on the controlling wheel, but during this interval the rotation of the driving shaft continues and tension is stored in the spring to operate the spool when the pawl and film controlled thereby are next released.

The controlling wheel by one of its teeth first engages the tail of the shutter member effecting the opening of the shutter and after the shutter is closed by its tension spring another tooth rocks the detent to release the film held by its roll and permits the receiving spool to feed the film for the proper distance. The movement of this detent across the curved face of the pawl rocks it back into holding position to engage the next tooth of the detent wheel. This construction produces an accurate and absolute timing of the exposure and feed mechanisms. The pressure plate at the lens tube retains the film in proper flat position while permitting the feed thereof without strain. The film spools are adapted to be removed from the camera in the usual manner when desired for development or other purpose. It will also be understood that parts of this structure are equally applicable for use in a projecting apparatus for motion pictures.

While a number of the details of this mechanism have been specifically described the invention is not confined thereto as changes may be made therein without departing from the spirit of the invention as defined by the claims thereon.

What I claim is:—

1. In a motion picture camera, film feeding and receiving spools, a driving shaft upon which the latter is loosely mounted, and a film escapement controlled by a member upon said receiving spool shaft to permit the film to be placed under a predetermined tension and subsequently released therefrom.

2. In a motion picture camera, film feeding and receiving spools, a driving shaft upon which the latter is loosely mounted, a spring driving connection secured at one end to said shaft and releasably connected at its opposite end to said receiving spool, and a film escapement controlled by a member upon the receiving spool shaft.

3. In a motion picture camera, film feeding and receiving spools, a driving shaft upon which the latter is loosely mounted, a spring connection secured to said shaft and having a loose coiled connection frictionally engaging the receiving spool to permit release or rest of the latter when a predetermined spring tension thereon has been secured, and a film escapement controlled by a member upon the receiving spool shaft.

4. In a motion picture camera, film feeding and receiving spools, a driving shaft upon which the latter is loosely mounted, a spring connected at one end to said shaft and having frictional driving contact at its opposite end with a portion carried by said receiving spool, and a film escapement controlled by a member upon the receiving spool shaft.

5. In a motion picture camera, film feeding and receiving spools, the latter being provided with a driving hub, a driving shaft upon which the latter is loosely mounted, a coiled spring connected at one end to said shaft and having its opposite end frictionally embracing said hub, and a film escapement controlled by a member upon the receiving spool shaft.

6. In a motion picture camera, film feeding and receiving spools, a driving shaft for the latter, a lens, a shutter mechanism coöperating therewith, and means carried by said shaft to effect an intermittent film feed by the receiving spool and control said shutter mechanism.

7. In a motion picture camera, film feeding and receiving spools, a driving shaft for the latter, a lens, a shutter mechanism coöperating therewith, and a controlling wheel mounted upon said shaft and connected with said receiving spool to effect an intermittent feed thereof.

8. In a motion picture camera, film feeding and receiving spools, a driving shaft for the latter, a lens, a shutter mechanism coöperating therewith, and a controlling wheel mounted upon said shaft and connected with said receiving spool to effect an intermittent feed thereof and actuate said shutter mechanism.

9. In a motion picture camera, film feeding and receiving spools, a driving shaft for the latter, a film holding wheel, a detent mechanism connected with the shaft thereof, and a controlling wheel mounted upon the shaft of the receiving spool and disposed to actuate said detent mechanism to release the film.

10. In a motion picture camera, film feeding and receiving spools, a driving shaft for the latter, a film holding wheel, a detent member upon the shaft thereof, a pawl coöperating with said detent, and a controlling wheel mounted upon the shaft of the receiving spool and disposed to actuate said pawl to release the film.

11. In a motion picture camera, film feeding and receiving spools, a driving shaft for the latter, a film holding wheel, a detent upon the shaft thereof, a pawl coöperating with said detent member, a shutter mechanism having an operating tail, and a controlling wheel mounted upon the shaft of the receiving spool and disposed to actuate said tail and pawl.

12. In a motion picture camera, film feeding and receiving spools, a driving shaft for the latter, a lens, a shutter mechanism coöperating therewith and having an operating portion, and a controlling wheel upon said shaft having spaced teeth disposed to actuate said portion.

13. In a motion picture camera, film feeding and receiving spools, a driving shaft for the latter, a lens, a shutter mechanism coöperating therewith and having an operating portion, a controlling wheel upon said shaft having spaced teeth disposed to actuate said portion, and means to control the intermittent movement of the film arranged to be released by the teeth of said wheel.

14. In a motion picture camera, film feeding and receiving spools, a driving shaft for the latter, a toothed holding wheel, a detent wheel upon the shaft thereof having spaced teeth, a rocking pawl coöperating with said teeth, and a toothed controlling wheel mounted upon said driving shaft and adapted to contact with one end of said pawl.

15. In a motion picture camera, film feeding and receiving spools, a driving shaft for the latter, a toothed holding wheel, a detent wheel upon the shaft thereof having spaced teeth, a rock-pawl having a curved face coöperating with said teeth, and a toothed controlling wheel mounted upon said driving shaft and adapted to contact with one end of said pawl.

16. In a motion picture camera, film feeding and receiving spools, a driving shaft for the latter, a toothed holding wheel, a detent wheel upon the shaft thereof having spaced teeth, a rocking pawl coöperating with said teeth, a shutter mechanism having an operating extension, and a toothed controlling wheel yieldingly connected with said receiving spool and disposed to contact with said extension and pawl.

17. In a motion picture camera, film feeding and receiving spools, a lens, a film escapement mechanism adapted to be intermittently released, a shutter mechanism for said lens comprising opposite pivoted levers, one of which is formed with an operating extension, and means controlled by the receiving spool shaft and adapted to engage said extension to actuate said levers and to automatically release said film escapement mechanism.

18. In a motion picture camera, film feeding and receiving spools, a lens, a film escapement adapted to be intermittently released, a shutter mechanism for said lens comprising opposite pivoted bell crank levers connected for joint operation, an extension from one of said levers, and means controlled by the receiving spool shaft and disposed to engage and operate said extension and to automatically control said film escapement.

19. In a motion picture camera, film feeding and receiving spools, a lens, a shutter mechanism therefor comprising opposite pivoted bell crank levers having a slot and arm connection for joint operation, an offset extension from one of said levers, means for moving said extension in one direction, and means for restoring the same.

20. In a motion picture camera, film feeding and receiving spools, a driving shaft for the latter, a lens, a shutter mechanism therefor comprising opposite pivoted bell crank levers having a slot and arm connection for joint operation, an offset extension from one of said levers, a controlling wheel carried by said shaft and having a tooth disposed to engage said extension, and a restoring spring operating against said extension.

21. In a motion picture camera, a film escapement, film feeding and receiving spools, a driving disk secured to the latter and provided with a hub, a driving shaft upon which said disk and receiving spool are rotatably mounted, a coiled spring frictionally embracing said hub, and a film escapement controlling wheel secured to said shaft and to which the outer end of said spring is connected.

22. In a motion picture camera, film feeding and receiving spools, a driving shaft for the latter, a film holding wheel provided with a detent, a pawl coöperating with said detent, a controlling wheel upon said shaft and adapted to actuate said pawl, and a spring connection between said controlling wheel and the receiving spool.

23. In a motion picture camera, film feeding and receiving spools, a driving shaft for the latter, a film holding wheel provided with a detent, a pawl coöperating with said detent, a controlling wheel upon said shaft adapted to actuate said pawl, a spring connection between said controlling wheel and the receiving spool, and a shutter mechanism having an operating extension disposed in the path of said controlling wheel to be operated thereby.

24. In a motion picture camera, film feeding and receiving spools, a driving shaft for the latter, film holding means, a shutter mechanism, and a controlling wheel arranged to rotate said receiving spool and successively actuate said shutter mechanism and holding means.

25. In a motion picture camera, film feeding and receiving spools, a driving shaft upon which the latter is loosely mounted, means carried by the shaft of the receiving spool to apply a predetermined driving tension forming a substantially positive connection between said shaft and receiving spool during the driving movement and arranged to permit said spool to remain at rest when said tension is exceeded, and a film escapement controlled by a member upon the receiving spool shaft.

26. In a motion picture camera, film feeding and receiving spools, a driving shaft upon which the latter is loosely mounted, film escapement means controlled by a member upon the receiving spool shaft and adapted to be intermittently released, and a yielding connection between said driving shaft and receiving spool arranged to control said means and to permit continued rotation of said shaft when the film is held.

In testimony whereof I affix my signature in the presence of two witnesses.

CHARLES SPIRO.

Witnesses:
STEPHEN F. CURTIS,
E. F. TIEDEMAN.